Nov. 24, 1936.  J. F. DREYER  2,062,088

FLEXIBLE VENEER AND PROCESS FOR MAKING SAME

Filed March 7, 1934

Inventor:
John F. Dreyer,
By Dyrenforth, Lee, Chritton & Wiles,
Attys.

Patented Nov. 24, 1936

2,062,088

UNITED STATES PATENT OFFICE 2,062,088

FLEXIBLE VENEER AND PROCESS FOR MAKING SAME

John F. Dreyer, Cincinnati, Ohio, assignor to The Formica Insulation Company, a corporation of Ohio Application March 7, 1934, Serial No. 714,516

13 Claims. (Cl. 154—2)

This invention relates to a flexible veneer which can be used as a decorative wall covering, or the like.

The primary object of the invention is to provide a thin flexible veneer having an enamel-like surface, and an improved process for making the same from synthetic resin. Heretofore, ornamental surfaces of synthetic resins have been provided on thick rather rigid backing sheets. By employing the present invention, the many advantages of coverings of this type are obtained, but the difficulty and expense of handling the material has been greatly reduced. For example, the flexible veneer may be shipped in rolls without injury.

One of the features of the invention is to provide a strip of rather thin material, that is, from 0.015 to 0.10 inch in thickness, made up of a plurality of films or sheets impregnated with resins having different degrees of plasticity. The surface film or sheet may be of a comparatively brittle resin, for example, of the urea formaldehyde type, the next, a resin which is more plastic, such as of the phenol formaldehyde type and then a still more plastic resin of the thermoplastic type. It was discovered that by providing these graduations in plasticity, it was possible to bend the strip, without injury, on a much shorter radius than had heretofore been possible. In other words, a physical property is developed which might be described as "bendability". It is the ability to bend without rupture and is improved by laminating the sheets in a proper arrangement.

The invention is illustrated in a preferred embodiment in the accompanying drawing, in which—

Figure 1:
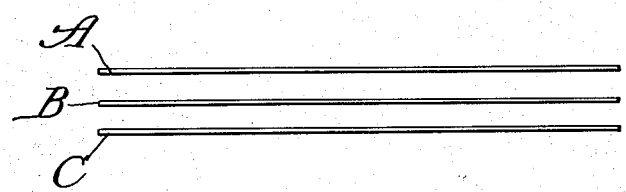
Figure 2:
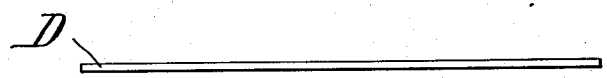
Figure 3:
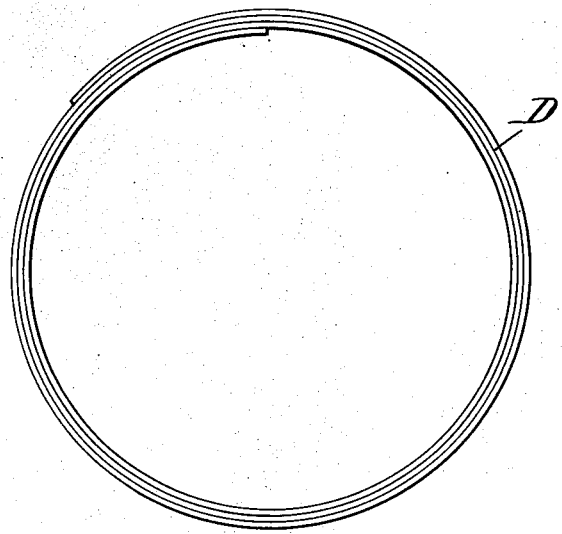

Fig. 1 illustrates a plurality of improved sheets or films prior to their consolidation under heat and pressure; Fig. 2, an elevational view of the composite flexible strip; and Fig. 3, an end elevational view of a roll of the flexible material ready for shipment.

Referring to the drawing, A designates a surface sheet, which may be decorated, and preferably is of the heat-reactive type; B, an intermediate film or binding strip which is more plastic than the strip A; C, a flexible backing film or sheet which is more plastic than either A or B; and D, a composite strip which is flexible and ready for use.

In discussing the various resins, I have grouped them under three classifications, namely: hard, medium and flexible. As a matter of convenience, I have called resins hard which, when in thin sheet form of the character herein described, after being consolidated under heat and pressure, cannot be bent to a two inch radius without breaking. Resins similarly treated, which can be bent on a half inch radius are termed flexible, and those in between are medium. In speaking of a sheet, I mean a layer of paper, cloth, or the like, which may be unimpregnated or may be impregnated with one or more resins. By film, I mean a layer of resin without the filler. I have found it possible to apply several coats of different resins to a single sheet.

The surface sheet A, preferably is impregnated with a resin of the hard type but retains some of its plasticity after being consolidated under heat and pressure. These hard resins may be either of the thermo-setting or permanently thermo-plastic type.

The hard resin may be of the urea-formaldehyde type, which is a synthetic resin, commonly employed as a varnish, whose solvent comprises at least a moderate percentage of water. Some plasticized non-thermoplastic resins are of hard character. The latter are thermo-setting resins which have been made pliable by addition of an agent known as a plasticizer. The hardness depends upon the degree of plasticization.

The sheet or film B should be a medium resin which is more flexible than the sheet A. A phenol-formaldehyde resin is suitable. Such a resin is synthetic, and has, for many years, been available in the form of a varnish for impregnating sheets of fabric, which, after drying, are pressed in a heated hydraulic press to produce a strong, water-resistant laminated product.

The sheet or film C may be of latex, cork fibre sheet, felt, cloth, paper, leather, or the like. It serves as a flexible backing and preferably is impregnated with a flexible resin having a higher degree of plasticity than either of the sheets A or B. "Vinylite" is a resin of the flexible type, sold under that name and well known on the market.

It is a synthetic resinoid made by polymerization of vinyl chloride, a compound ordinarily produced from ethylene. The degree of polymerization which the resinoid is given during its manufacture, determines the temperature and pressure necessary to cause the resin to flow. The varnish usually contains about 25% solid resin dissolved in acetone. Other ketone type solvents may be used, but acetone is the cheapest solvent for the resin now available. The acetone varnish can be diluted to some extent with the ester type of lacquer solvents.

"Plioform" is trade name for another flexible permanently thermo-plastic resin but is made from rubber.

These resins may have suitable color pigments or may be of water whiteness. In the finished product, they have the advantage of color-fastness, chemical resistance, and other features of the synthetic resins.

If desired, the sheet B may be omitted, but a superior product is obtained when it is used. Additional impregnated or unimpregnated sheets may be added as will be readily understood.

The assembly of sheets is placed in a heated press with the sheet A adjacent to a highly polished surface and the assembly is consolidated under heat and pressure with the resins acting as a bonding material between sheets. If desired, the consolidating may be accomplished by heating the material and running it between highly polished rolls which may be heated or operated within an oven. The flexible sheet thus obtained is different from existing materials in that it can have the highly polished enamel-like surface obtained by pressing synthetic resins against a polished surface.

In preparing the sheets, it will be understood that they may be impregnated with a suitable varnish and dried. Additional resins may be applied to the surface to form a film, if desired.

Examples of how various types of resins may be applied and combined, before consolidating under heat and pressure to obtain the desired product, are as follows:

1. Surface sheet A is impregnated with a medium resin and coated on the outer surface with a brittle, hard resin. Sheet B is impregnated with a flexible resin.

2. Sheet A is impregnated with a hard resin, sheet B is impregnated with a medium resin, and sheet C is impregnated with a flexible resin.

3. Sheet A is impregnated with a medium resin and coated on its outer surface with a hard resin. Sheet B is of a flexible fibrous material such as unimpregnated paper, or the like.

4. Sheet A is impregnated with a flexible resin, sheet B is impregnated with a medium resin, and sheet C is impregnated with a hard resin. (This is the reverse of Example 2.)

Preferably, the hard enamel-like surface provided by the hard resins is the decorated one and is to the outside as it has better wearing qualities, and is more attractive and serviceable than the surfaces provided by the more plastic resins. However, if desired, the more flexible resins may be decorated and the hard resin used in the backing sheet. In rolling up the material, preferably, the finished surface of the resin is to the inside.

The foregoing detailed description has been given for clearness of understanding only, and no unnecessary limitations should be understood therefrom, but the appended claims should be construed as broadly as permissible, in view of the prior art.

What I regard as new and desire to secure by Letters Patent is:

1. The process of producing is thin flexible veneer having an enamel-like surface which comprises: coating one side of a thin surface sheet with a plurality of films of synthetic resins graduated in the order of their degree of bendabililty that is hard, medium, and flexible, respectively, and consolidating the same under heat and pressure.

2. A flexible veneer having an enamel-like surface, said veneer comprising a thin surface sheet of hard synthetic resin enamel, a thin flexible backing sheet and an interposed binding film of higher plasticity than the surface resin such as a medium or flexible resin, the assembly having been consolidated under heat and pressure.

3. A flexible veneer having an enamel-like surface, said veneer comprising: a decorative surface sheet impregnated with a resin of the urea formaldehyde type, an intermediate sheet impregnated with a resin of the phenol formaldehyde type, and a backing sheet impregnated with a resin of the thermo-plastic type, the assembly having been consolidated under heat and pressure.

4. A flexible veneer having an enamel-like surface, said veneer being between 0.015 and 0.10 inch in thickness and comprising a decorative surface sheet impregnated with a hard resin of the urea formaldehyde type, an intermediate sheet impregnated with a medium resin of the phenol formaldehyde type, and a backing sheet impregnated with a flexible resin of the thermoplastic type, the whole being consolidated under heat and pressure.

5. A flexible veneer having an enamel-like surface, a thin surface sheet impregnated with a hard resin of the urea formaldehyde type, a thin coating of resin of the phenol formaldehyde type on the inner side of the surface sheet having a higher degree of plasticity than said hard resin, and a thin flexible backing sheet of latex, the assembly having been consolidated under heat and pressure.

6. The process of producing a thin flexible veneer having an enamel-like surface which comprises: applying to a thin surface sheet a coating comprising a hard resin of the urea formaldehyde type, next applying a medium resin film of the phenol formaldehyde type, then applying a flexible resin of the thermo-plastic type, and slowly passing the assembly between hot polished pressure rolls to consolidate the same and render the resins substantially infusible and insoluble.

7. A flexible veneer having an enamel-like surface, said veneer being between 0.015 and 0.10 inch in thickness and comprising a surface sheet impregnated with a resin of the urea formaldehyde type, an intermediate sheet impregnated with a resin of the phenol formaldehyde type, and a backing sheet impregnated with a resin of the thermo-plastic type, the assembly having been consolidated under heat and pressure.

8. The process of producing a thin flexible veneer having an enamel-like surface which comprises: impregnating a thin surface sheet of fabric with a hard resin varnish; drying said sheet; superposing said surface sheet on a thin flexible backing sheet and providing an intervening medium resin as a bonding agent; and consolidating the assembly under heat and pressure.

9. The process of producing a thin flexible veneer having an enamel-like surface which comprises: superposing a thin surface sheet impregnated with a urea formaldehyde resin, upon a thin body sheet impregnated with a phenol formaldehyde resin, and consolidating the assembly under heat and pressure.

10. The process of producing a thin flexible veneer having an enamel-like surface which comprises: superposing a thin surface sheet impregnated with a urea formaldehyde resin, upon a thin body sheet impregnated with a phenol formaldehyde resin, superposing said body sheet in turn upon an additional body sheet impregnated with polymerized vinyl chloride, and consolidating the assembly under heat and pressure.

11. The process of producing a thin flexible veneer having an enamel-like surface which compries: applying to a thin surface sheet a urea-formaldehyde resin varnish, next applying a film of phenol formaldehyde resin varnish, then applying a film of polymerized vinyl chloride, and consolidating under heat and pressure.

12. A flexible veneer having an enamel-like surface, said veneer comprising a thin surface sheet having its outer surface impregnated with urea-formaldehyde resin, and a thin flexible backing sheet impregnated with a phenol formaldehyde resin, the assembly having been consolidated under heat and pressure.

13. A flexible veneer having an enamel-like surface, a thin surface sheet impregnated with a hard resin of the urea formaldehyde type, a thin flexible cork fiber backing sheet impregnated with a flexible resin produced by polymerization of vinyl chloride, and an interposed binding film of a medium resin such as phenol formaldehyde, the assembly having been consolidated under heat and pressure.

JOHN F. DREYER.